United States Patent [19]

Lynch et al.

[11] Patent Number: 5,245,238
[45] Date of Patent: Sep. 14, 1993

[54] AXIAL GAP DUAL PERMANENT MAGNET GENERATOR

[75] Inventors: Leo A. Lynch, Belvidere; Alexander Krinickas, Jr., Rockford; Barry J. Parker, Rockford; Mahesh Shah, Rockford; Jayant Vaidya, Rockford; John B. Huss, Rockford, all of Ill.

[73] Assignee: Sundstrand Corporation, Rockford, Ill.

[21] Appl. No.: 693,622

[22] Filed: Apr. 30, 1991

[51] Int. Cl.⁵ .................... H02K 23/60; H02K 1/22
[52] U.S. Cl. ................................ 310/116; 310/152; 310/267; 310/268
[58] Field of Search ............... 310/75 A, 77, 79, 114, 310/152, 156, 267, 268, 115, 116

[56] References Cited

U.S. PATENT DOCUMENTS

| | | | |
|---|---|---|---|
| 3,233,133 | 2/1966 | Kober | 310/171 |
| 3,525,005 | 8/1970 | Beyers | 310/156 |
| 3,713,015 | 1/1973 | Frister | 322/28 |
| 4,031,421 | 6/1977 | Geiger | 310/112 |
| 4,237,396 | 12/1980 | Blenkinsop et al. | 310/154 |
| 4,305,031 | 12/1981 | Wharton | 322/29 |
| 4,371,801 | 2/1983 | Richter | 310/156 |
| 4,578,609 | 3/1986 | McCarty | 310/156 |
| 4,663,581 | 5/1987 | Glennon | 322/52 |
| 4,728,841 | 3/1988 | Sugden | 310/114 |
| 4,814,654 | 3/1989 | Gerfzst | 310/154 |
| 4,817,461 | 4/1989 | Iseman | 74/720 |
| 4,866,321 | 9/1989 | Blanchard et al. | 310/112 |
| 4,879,484 | 11/1989 | Huss | 310/114 |
| 4,882,513 | 11/1989 | Flygare | 310/114 |
| 4,996,457 | 2/1991 | Hawsey et al. | 310/268 |
| 5,079,461 | 1/1992 | Schlüter et al. | 310/67 A |

FOREIGN PATENT DOCUMENTS 2007310 4/1969 France .

Primary Examiner—Steven L. Stephan
Assistant Examiner—D. R. Haszko
Attorney, Agent, or Firm—Antonelli, Terry, Stout & Kraus

[57] ABSTRACT

A permanent magnet generator having a plurality of permanent magnet generator units which produce a controlled output potential by mutual magnetic flux linkage between the permanent magnet generator units to produce the controlled output potential in accordance with the invention includes a plurality of permanent magnet rotors (20 and 22) mounted on a drive shaft (26) with at least one of the rotors being rotatable with respect to the drive shaft to vary an angular position of the at least one of the rotors relative to the shaft to produce a mutual variable magnitude magnetic axial field extending parallel to the drive shaft; at least one stator (26, 28, 72) disposed at a position axially offset from the plurality of rotors which is magnetically coupled to the variable magnitude permanent magnet axially field; and a mechanism (46, 48) responsive to a stator fault for angularly positioning the rotors relative to each other so that the permanent magnetic field coupled to the at least one stator is zero.

33 Claims, 11 Drawing Sheets

ROTOR MAGNETS IN LINE (0° DISPLACEMENT);
MAX FLUX CONDITION

ROTOR MAGNETS DISPLACED;
TYPICAL OF VOLTAGE CONTROL IN NORMAL OPERATION

ROTOR MAGNETS OPPOSED;
ZERO ARMATURE FLUX CONDITION

LEGEND

— ARMATURE
⊓⊓ Fe CORE
[N S] FIELD MAGNET
▨ NON-MAGNETIC MAGNET CARRIER
↘ FLUX LOOP PATH

ROTOR MAGNETS IN LINE -
MAX ARMATURE FLUX CONDITION

ROTOR MAGNETS DISPLACED -
TYPICAL OF VOLTAGE CONTROL IN NORMAL OPERATION

ROTOR MAGNETS OPPOSED -
ZERO ARMATURE FLUX CONDITION

LEGEND

- ARMATURE Fe CORE
- [N S] FIELD MAGNET
- NON-MAGNETIC MAGNET CARRIER
- FLUX LOOP PATH

ROTOR MAGNETS IN LINE -
MAX ARMATURE FLUX CONDITION

ROTOR MAGNETS DISPLACED -
TYPICAL OF VOLTAGE CONTROL IN NORMAL OPERATION

ROTOR MAGNETS OPPOSED -
ZERO ARMATURE FLUX CONDITION

ROTORS POSITIONED TO BRING UNLIKE POLES INTO ALIGNMENT - MAX. ARMATURE FLUX CONDITION

ROTORS DISPLACED - TYPICAL OF VOLTAGE CONTROL IN NORMAL OPERATION

ROTORS POSITIONED TO BRING LIKE POLES INTO ALIGNMENT - ZERO ARMATURE FLUX CONDITION

LEGEND
- ARMATURE Fe CORE
- FIELD MAGNET
- POLE PIECE MAGNETIC
- FLUX LOOP PATH

ROTORS POSITIONED TO BRING LIKE POLES INTO ALIGNMENT - MAX. ARMATURE FLUX CONDITION

ROTORS DISPLACED - TYPICAL OF VOLTAGE CONTROL IN NORMAL OPERATION

ROTORS POSITIONED TO BRING UNLIKE POLES INTO ALIGNMENT - ZERO ARMATURE FLUX CONDITION

ROTORS POSITIONED TO BRING LIKE MAGNET POLES INTO ALIGNMENT - MAX. ARMATURE FLUX CONDITION

ROTORS DISPLACED - TYPICAL OF VOLTAGE CONTROL IN NORMAL OPERATION

ROTORS POSITIONED TO BRING UNLIKE MAGNET POLES INTO ALIGNMENT - ZERO ARMATURE FLUX CONDITION

AXIAL GAP DUAL PERMANENT MAGNET GENERATOR

CROSS-REFERENCE TO RELATED APPLICATION

Reference is made to U.S. patent application Ser. No. 07/693,729, entitled "Torque Driven Dual PMG Actuator", filed on even date herewith, which is assigned to the assignee of the present invention which application is incorporated by reference in its entirety.

DESCRIPTION

Technical Field

The present invention relates to multiple permanent magnet generators which produce a controlled output potential. More particularly, the present invention relates to generators of the aforementioned type which have mutual axial flux linkage between each generator rotor and stator.

Background Art

The development of very high energy permanent magnets has made possible the design of permanent magnet generators (PMG) which equal or surpass wound field generators specific output (KVA per unit weight). This has made PMG's an attractive alternative to wound field generators for aerospace electrical generating systems where weight is always a prime consideration.

A potential advantage of permanent magnet generators over wound field generators is the elimination of the rotor field power. The elimination of the rotor field power and the exciters, rotating rectifiers and other apparatus for providing the rotor field power save weight, permit higher speeds of operation, lower manufacturing costs and higher reliability and efficiency. A PMG has a significant weight advantage in systems where the frequency of generation of electrical power is not required to be 400 Hz. such as 270 volt DC and variable speed constant frequency (VSCF) electrical power generating systems which are driven directly by a variable speed power takeoff from an airframe propulsion engine.

However, PMG's when compared to wound field generators, have a disadvantage regarding the control of the output voltage and protection against electrical faults. These disadvantages result from the fact that the permanent magnet field produced by the rotor is fixed and cannot be turned off as is the case with the wound field generator.

Output voltage control of PMG's can be achieved by using a switching electronic regulator. However, for typical aircraft power levels this requires heavy and expensive switching devices. Furthermore, substantial switching losses reduce system efficiency. Lessened reliability results as a consequence of the complexity of the switching electronic regulator.

Voltage control for permanent magnet generators has been provided by multiple permanent magnet generators having either one or more rotors or one or more stators which are rotated with respect to one or more rotors or stators to produce a variable magnitude magnetic field which produces the generated output potential. The output voltage is regulated by the variation of the phase angle between the multiple generator outputs produced in a common stator winding or by varying the relative angular position of the stators which are magnetically coupled to the permanent magnet fields produced by the multiple rotors. Adjustment of the angle between the plural rotors or stators permits the reduction of the output potential of the generator to zero. However, during normal operation, large magnetic fluxes from the permanent magnet rotors are magnetically coupled to the stator which prevents the de-excitation of the stator to protect against faults in the stator winding.

U.S. Pat. Nos. 3,713,015, 4,305,031, 4,371,801, 4,663,581, 4,728,841, 4,817,461, 4,879,484 and 4,882,513 and French Patent 2,007,310 are representative of the aforementioned prior art. These systems use actuators to rotate a rotor or stator to vary a relative phase angle between the generator rotors or stators to provide voltage control. These systems are complex, expensive and require an energy source to power the actuator.

In the prior art the only protection against internal winding faults for single or multiple rotor PMG's has been to mechanically disconnect the rotor from the source of rotational energy to bring the rotors to rest. A mechanical disconnect is interposed between the prime mover and the drive shaft of the rotor to permit the disconnection. In prior art PMG's with multiple rotors variation of the relative phase angle between the rotors may reduce the output potential to zero but does not decouple the permanent magnetic fields from the stator(s) when the output potential is reduced to zero.

DISCLOSURE OF INVENTION

The present invention is a multiple rotor PMG having a controlled output potential which is controlled by rotating at least one rotor with respect to at least one other rotor to produce a variable magnitude axial (parallel to the axis of rotation of the generator) mutual flux linkage between the multiple rotors and at least one stator which provides de-excitation of the at least one stator in response to a stator fault without the mechanical disconnect of the prior art. The present invention may either use an actuator powered from an external source to vary the phase relationship between the multiple rotors to control the output potential of the generator and decouple the magnetic field from the stator or an actuator which utilizes stored energy produced during rotation of the permanent magnet rotors, such as a magnetic field or the torsion in a spring to provide at least an assist and preferably all of the energy necessary to vary the phase relationship between the multiple rotors, to vary the output potential and decouple the magnetic field from the stator.

The present invention, which utilizes mutual axial flux linkage between a plurality of PMG rotors and at least one stator to vary the output potential of the generator and to further decouple the stator from the magnetic flux produced by the multiple PMG rotors when a stator fault is present is an improvement over the cylindrical PMG's of the prior art discussed above. The present invention permits the total decoupling of the mutual magnetic field produced by the multiple PMG rotors from the stator(s) in response to a stator fault whereas prior art cylindrical PMG's, which rely upon a radial flux linkage between a plurality of PMG rotors and at least one stator, only permit the output potential to be dropped to zero but do not permit the decoupling of the magnetic field produced by the multiple PMG rotors from a stator in response to a stator fault. As a result, in order to protect the stator against internal stator faults it was necessary in the prior art to provide a mechanical disconnect as discussed above which requirement is eliminated by the present invention.

Furthermore, the present invention has substantial advantages over the prior art which include a weight savings when compared to the prior art cylindrical multiple PMG generators discussed above. The present invention in some embodiments saves weight by the elimination of either rotor pole pieces or a rotor yoke as in the prior art cylindrical PMG generators. Cylindrical PMG's which utilize radial flux linkage between the PMG rotors and the stator require a magnetic yoke to link adjacent rotor magnets and cylindrical PMG rotors of a tangential configuration require magnetic pole pieces to route the magnetic flux from the magnets to the armature. Furthermore, the present invention controls the magnitude of the mutual magnetic flux linkage between the multiple PMG rotors and the at least one axially spaced apart stator to control the output potential which reduces iron losses present in the prior art to provide improved efficiency. Additionally, the present invention may utilize multiple stator windings which provides fault tolerance depending upon the manner of utilization of the outputs of the individual windings and the nature of the fault. The stator windings, which are excited by the mutual axial magnetic field produced by the rotors, may be either in series or parallel.

A permanent magnet generator in accordance with the invention has a plurality of permanent magnet generator units which produce a controlled output potential by flux linkage between the permanent magnet generator units. The invention includes a plurality of permanent magnet rotors mounted on a drive shaft with at least one of the rotors being rotatable with respect to the drive shaft to vary an angular position of at least one of the rotors relative to the shaft to produce a variable magnitude magnetic axial field extending parallel to the drive shaft. At least one stator is disposed at a position axially offset from the plurality of rotors which is magnetically coupled to the variable magnitude magnetic axial field. A mechanism, responsive to a stator fault, positions the rotors angularly relative to each other so that the magnetic field coupled to the at least one stator is zero during rotation of the rotors. Energy stored within the mutual magnetic field extending between the plurality of permanent magnet rotors or within a torsion spring which is coupled to the drive shaft and the at least one rotor and is utilized to rotate the rotors to a relative angular position at which the magnetic field coupled to the at least one stator is zero in response to a stator fault.

A first embodiment of a permanent magnet generator having a plurality of permanent magnet generator units produces a controlled output potential by mutual magnetic flux linkage between the permanent magnet generator units in which first and second permanent magnet rotors are mounted on the drive shaft each having opposed first radially extending faces with one of the pair of rotors being rotatable with respect to the drive shaft. First and second stators are fixed to prevent rotation with respect to the drive shaft with a first radially extending face of the first stator facing a second radially extending face of the first rotor which is parallel to the first radially extending face of the first rotor and a first radially extending face of the second stator facing a second radially extending face of the second stator which is parallel to the first radially extending face of the second rotor. A plurality of radially extending permanent magnets are mounted in each of the first and second rotors at spaced apart circumferential locations disposed around a circumference of the first and second rotors with radially extending non-magnetizable material sections being disposed between adjacent permanent magnets. A mutual variable magnitude magnetic axial field during generation of the output potential extends in a loop enclosing opposed non-magnetic material sections of the rotors with the loop passing through opposed sections of the first and second stators and spatially opposed pairs of permanent magnets of the first and second rotors.

A second embodiment of a permanent magnet generator having a plurality of permanent magnet generator units produces a controlled output potential by mutual magnetic flux linkage between the permanent magnet generator units in which a stator is fixed to prevent rotation with respect to a drive shaft having first and second opposed radially extending faces. First and second permanent magnet rotors are attached to the drive shaft with the first rotor having a radially extending face parallel to and opposed to the first face of the stator and the second rotor having a radially extending face parallel to and spatially opposed to the second face of the stator with one of the first and second rotors being rotatable with respect to the drive shaft. A plurality of radially extending permanent magnets are mounted in each of the first and second rotors at spaced apart circumferential locations disposed around a circumference of the first and second rotors with radially extending non-magnetizable material sections being disposed between adjacent permanent magnets. A mutual variable magnitude magnetic axial field during generation of the output potential extends in a loop enclosing opposed non-magnetic material sections of the rotors with the loop passing through adjacent sections of the stator which is fixed and spatially opposed pairs of permanent magnets and a magnetic yoke of the first and second rotor.

A third embodiment of a permanent magnet generator having a plurality of permanent magnet generator units produces a controlled output potential by mutual magnetic flux linkage between the permanent magnet generator units in which a stator is fixed to prevent rotation with respect to the drive shaft having opposed radially extending faces and first and second permanent magnet rotors are attached to the drive shaft with the first and second rotors having radially extending faces parallel to the radially extending faces of the stator with the faces of the first and second rotors being spatially opposed to only one radially extending face of the stator with one of the first and second rotors being rotatable with respect to the drive shaft. A plurality of radially extending permanent magnets are mounted in each of the first and second rotors at spaced apart circumferential locations disposed around a circumference of the first and second rotors with radially extending non-magnetizable material sections being disposed between adjacent permanent magnets. A mutual variable magnitude magnetic axial field during the generation of the output potential extends in a loop enclosing spatially opposed non-magnetic material sections of the rotors with the loop passing through the stator which is fixed and spatially opposed pairs of the permanent magnets and a magnetic yoke of the first and second rotors.

A fourth embodiment of a permanent magnetic generator having a plurality of permanent magnet generator units produces a controlled output potential by mutual magnetic flux linkage between the permanent magnet generator units in which a stator is fixed to prevent rotation with respect to the drive shaft having first and second opposed radially extending faces and first and second permanent magnet rotors are attached to the drive shaft with the first rotor having a radially extending face parallel and spatially opposed to the first face of the stator and the second rotor having a radially extending face parallel and spatially opposed to the second face of the stator with one of the first and second rotors being rotatable with respect to the drive shaft. A plurality of radially extending permanent magnets are mounted in each of the first and second rotors at spaced apart circumferential locations disposed around a circumference of the first and second rotors with radially extending magnetically permeable material sections being disposed between adjacent permanent magnets. A variable magnitude magnetic axial field during generation of the output potential extends in a loop extending through adjacent magnetically permeable material sections in the first and second rotors, adjacent sections of the stator which is fixed and spatially opposed pairs of permanent magnets.

A fifth embodiment of a permanent magnet generator having a plurality of permanent magnet generator units produces a controlled output potential by mutual magnetic flux linkage between permanent magnet generator units in which a stator is fixed to prevent rotation with respect to the drive shaft having opposed radially extending faces and first and second permanent magnet rotors are attached to the drive shaft with the first and second rotors having radially extending faces parallel to the radially extending faces of the stator with the faces of the first and second rotors being spatially opposed to only one radially extending face of the stator with one of the first and second rotors being rotatable with respect to the drive shaft. A plurality of radially extending permanent magnets are mounted in each of the first and second rotors at spaced apart circumferential locations disposed around a circumference of the first and second rotors with radially extending magnetically permeable material sections being disposed between adjacent permanent magnets. The mutual variable magnitude magnetic axial field during the generation of the output potential extends in first and second loops, each loop extending through at least one of the first and second rotors, adjacent magnetically permeable material sections of at least one of the first and second rotors through, the stator which is fixed and a permanent magnets within one of the first and second rotors.

A sixth embodiment of a permanent magnet generator having a plurality of permanent magnet generator units produces a controlled output potential by mutual magnetic flux linkage between the permanent magnet generator units in which first and second permanent magnet rotors are mounted on the drive shaft each having spatially opposed first radially extending faces with one of the pair of rotors being rotatable with respect to the drive shaft and first and second stators are fixed to prevent rotation with respect to the drive shaft with a first radially extending face of the first stator facing a second radially extending face of the first rotor which is parallel to the first radially extending face of the first rotor and a first radially extending face of the second stator facing a second radially extending face of the second rotor which is parallel to the first radially extending face of the second rotor. A plurality of radially extending permanent magnets are mounted in each of the first and second rotors at spaced apart circumferential locations disposed around a circumference of the first and second rotors with radially extending magnetically permeable material sections being disposed between adjacent permanent magnets; and wherein the mutual variable magnitude magnetic axial field during generation of the output potential extends in a loop through adjacent magnetically permeable material sections, a permanent magnet and a section of one of the stators.

The orientation of the magnets which are mounted in the first and second rotors have an axis extending from a north pole to a south pole of the permanent magnets which is parallel to the drive shaft or an axis extending from a north pole to a south pole of the permanent magnets perpendicular to the drive shaft. Mounting of the magnets with the axis extending from the north pole to a south pole of the permanent magnets which is perpendicular to the drive shaft provides stored magnetic energy which is utilized to rotate the rotors to a relative angular position at which the magnetic field coupled to the at least one stator is zero in response to a fault. The stored magnetic energy may provide part of or all of the energy necessary to rotate the rotors to a position at which zero magnetic flux is coupled to the stator from the permanent magnet rotors in response to a fault in the stator.

BEST MODE FOR CARRYING OUT THE INVENTION

Figure 1:
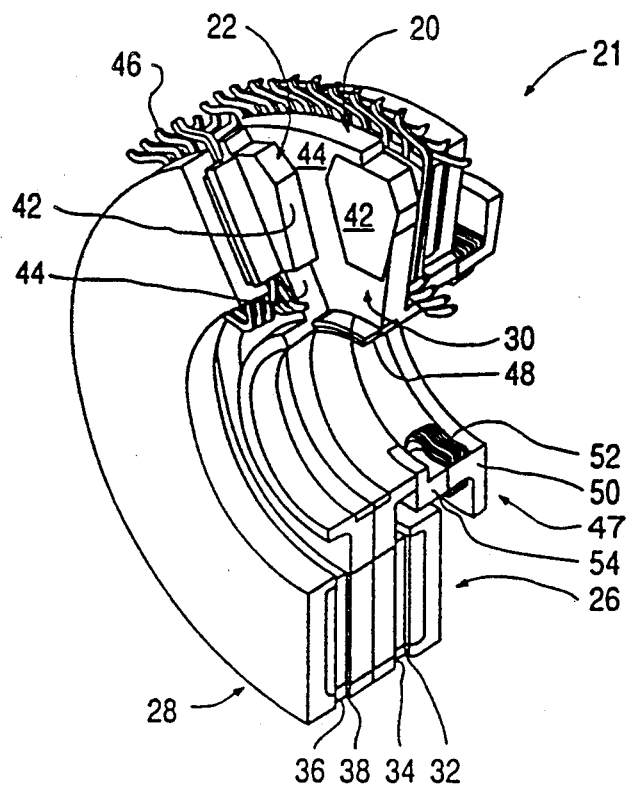
FIG. 1 illustrates a partial isometric view of a first embodiment of the present invention.

FIG. 1 illustrates a first embodiment 21 of the present invention. First and second permanent magnet rotors 20 and 22 are mounted on a drive shaft 24. First and second stators 26 and 28 are mounted outboard of the first and second permanent magnet rotors 20 and 22. The output potential of the first and second stators 26 and 28 is regulated by varying the relative angular relationship between first and second permanent magnet rotors. The first and second permanent magnet rotors 20 and 22 each have opposed first radially extending faces 30 with one of the pair of rotors being rotatable with respect to the drive shaft as discussed below. The first and second stators 26 and 28 are fixed to prevent rotation with respect to the drive shaft 24 by a retaining mechanism (not illustrated). A first radially extending face 32 of the first stator 26 faces a second radially extending face 34 of the first rotor 20 which is parallel to the first radially extending faces of the rotors and a first radially extending face 36 of the second stator 28 faces a second radially extending face 38 of the second rotor 22 which is parallel to the first radially extending faces of the rotors. A plurality of radially extending permanent magnets 42 are mounted in each of the first and second rotors 20 and 22 at spaced apart circumferential locations disposed around a circumference of the first and second rotors with radially extending non-magnetizable material sections 44 being disposed between adjacent permanent magnets. The non-magnetizable material sections are preferably metallic and the permanent magnets are preferably magnetized in accordance with the magnetic orientation of FIG. 11 discussed below. It should be understood that the configuration of the stator windings 46 within the stators 26 and 28 is conventional.

A significant advantage of all of the embodiments of the present invention is that the mutual axial flux linkage between the plurality of permanent magnet rotors and one or more stators permits the magnetic flux linkage with the one or more stators to be reduced to zero in response to a stator fault. Permanent magnet generators having plural rotors having a radial flux linkage with the stator, which vary the relative angular position between the permanent magnet rotors to vary output potential, do not provide the magnetic decoupling of the stator from the permanent magnet rotor with the resultant disadvantages discussed above. With the invention, an externally powered actuator driven by electrical, hydraulic or mechanical energy, as in the prior art for varying the relative position between plural permanent magnet generator rotors for producing the voltage regulation, may be utilized to rotate at least one of the permanent magnet rotors with respect to at least one of the other permanent magnet rotors to decouple the flux linkage between the plurality of permanent magnet rotors and at least one stator in response to a stator fault and further to vary the output potential.

As illustrated, the first embodiment 21 utilizes a combination of an eddy current brake 47 and a torsion spring 48 for controlling the relative angular relationship between the first permanent magnet rotor 20 and the second permanent magnet rotor 22 to control the output potential from the generator and to rotate the first permanent magnet rotor 20 relative to the second permanent magnet rotor 22 to an angular position which totally decouples the mutual magnetic field produced by the permanent magnet rotors from the stators 26 and 28 in response to a stator fault. When a fault occurs, the output potential goes to zero which deactivates the eddy current brake 47. Ends of the torsion spring 48 are coupled to the drive shaft 24 and the first rotor 20 to provide torsional resistance to the force exerted on the permanent magnet rotors 20 and 22 in generating the output potential. The twisting of the torsion spring 48 during the generation of the output potential stores potential energy in the spring by rotating the rotors 20 and 22 out of phase to an angular relationship which produces the controlled output potential which is preferably regulated by a voltage regulator with a suitable voltage regulator being disclosed in application Ser. No. 07/693,729, entitled "Torque Driven Dual PMG Actuator", filed on even date herewith. The eddy current brake 47 preferably has a plurality of salient poles 50 which are disposed circumferentially around the drive shaft 24 at spaced apart locations. One or more windings 52 are wrapped around the salient poles 50 for applying an electric current proportional to a difference between the output potential and a desired regulated output potential as described above in the aforementioned patent application Ser. No. 07/693,729 entitled "Torque Driven Dual PMG Actuator", filed on even date herewith. A magnetically permeable annular ring 54 is attached to the first rotor 20 so that braking torque applied by the eddy current brake 47 causes an additional rotation of the permanent magnet rotor 20 sufficient to cause the output potential to be driven to the regulated output potential as described above in the aforementioned patent application Ser. No. 07/693,729, entitled "Torque Driven Dual PMG Actuator", filed on even date herewith. While the combination of the eddy current brake 47 and torsion spring 48 is illustrated with respect to the first embodiment 21, it should be understood that other forms of actuators may be utilized to produce relative rotation between the rotors 20 and 22. An advantage of utilizing the torsion spring 48 is that the stored mechanical energy within the torsion spring produced by the regulation of the output potential is converted to kinetic energy to at least assist the rotation of the first and second permanent magnet rotors 20 and 22 to a position in which the mutual magnetic flux linkage with the stators 26 and 28 is zero in response to a stator fault.

Figure 12A:
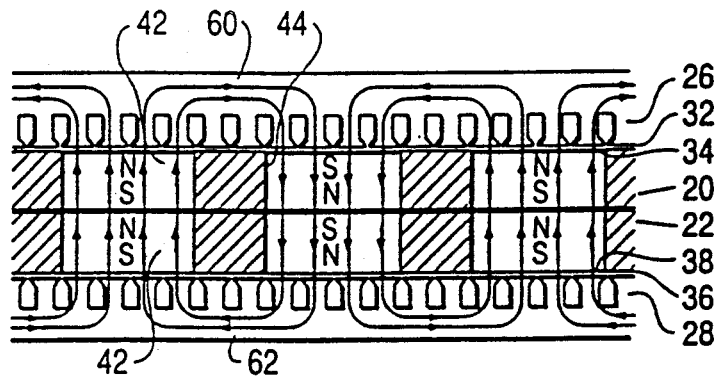
FIGS. 12(a)–12(c) illustrate the flux linkages of a first embodiment of the present invention.
Figure 12B:
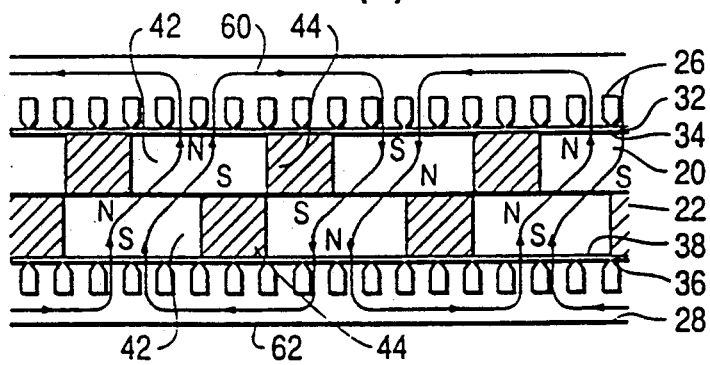
Figure 12C:
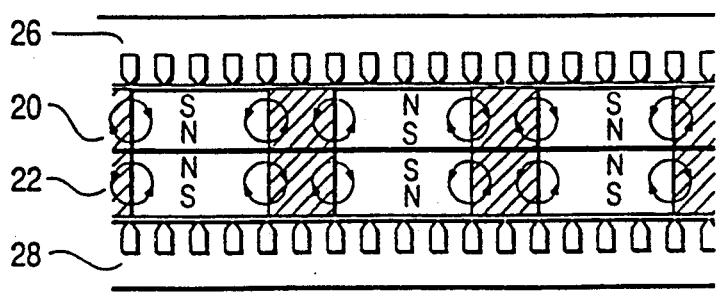

FIGS. 12 (a)–(c) illustrate a partial circumferential sectional view of the permanent magnet rotors 20 and 22 and the stators 26 and 28 illustrating the mutual variable magnitude magnet axial field. FIGS. 12(a) and 12(b) illustrate the mutual variable permanent magnetic flux linkage during generation of the output potential which extends in a flux loop path enclosing spatially opposed non-magnetic material sections 44 with the loop passing through spatially opposed sections 60 and 62 of the first and second stators and opposed permanent magnet pairs 42 of the first and second rotors. FIG. 12(c) illustrates the magnetic flux linkage which occurs when a stator fault is present in which the magnetic field from the permanent magnet rotors 20 and 22 is decoupled from the stators 26 and 28. The uncoiled state of the torsion spring 48 positions the permanent magnet rotors 20 and 22 as illustrated in FIG. 12(c) to decouple the mutual axial magnetic field from the stators 26 and 28.

Figure 5:
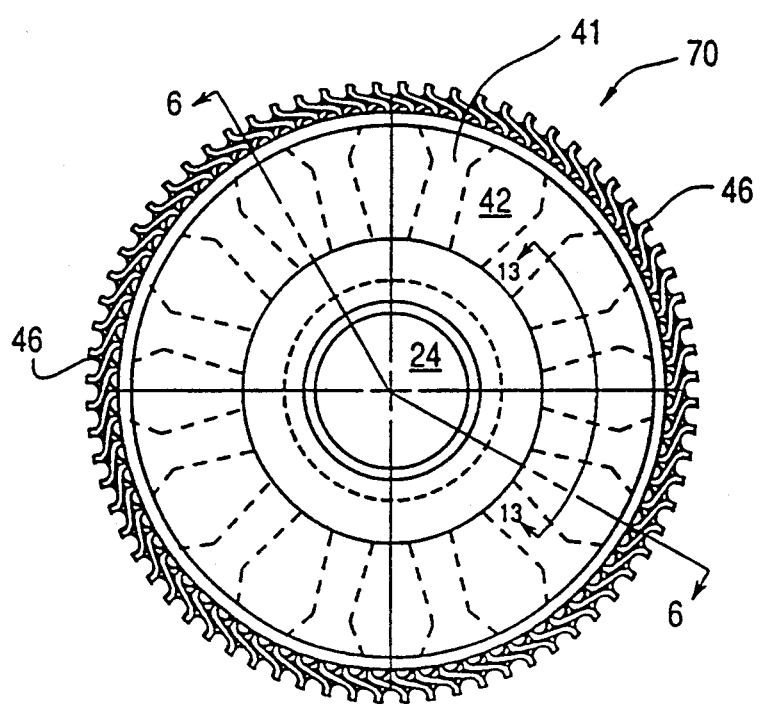
FIG. 5 illustrates an end view of the second embodiment of the present invention.
Figure 3:
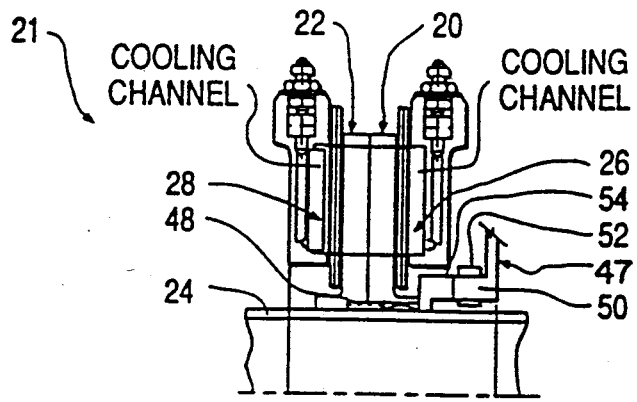
FIG. 3 illustrates a radial sectional view of FIG. 2.
Figure 6:
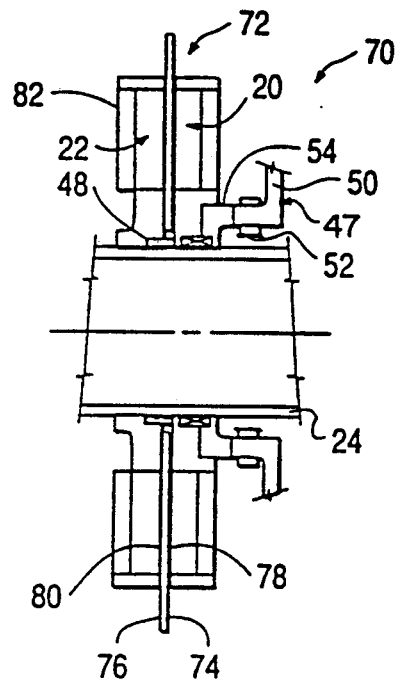
FIG. 6 illustrates a radial sectional view of FIG. 5.
Figure 4:
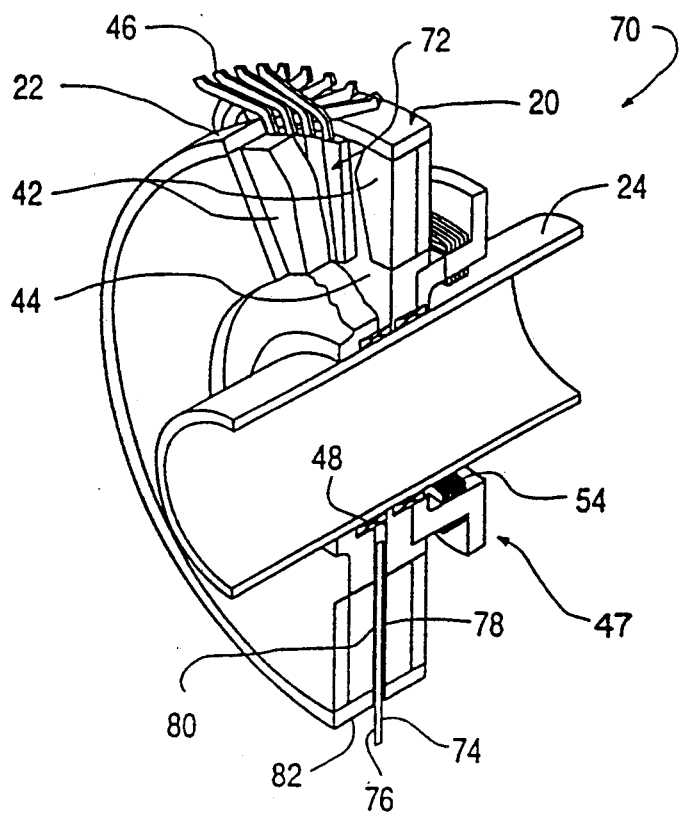
FIG. 4 illustrates a partial isometric view of a second embodiment of the present invention.

FIGS. 4–6 illustrate a second embodiment 70 in accordance with the present invention. Like reference numerals identify like parts in FIGS. 1–6. Stator 72 is fixed to prevent rotation with respect to the drive shaft 24. The stator 72 has first and second radially extending faces 74 and 76. The first and second permanent magnet rotors 20 and 22 are attached to the drive shaft 24 with the first rotor having a radially extending face 78 parallel and opposed to the first face 74 of the stator 72 and the second rotor 22 having a radially extending face 80 parallel and opposed to the second face 76 of the stator with one of the first and second rotors being rotatable with respect to the drive shaft. As illustrated, torsion spring 48 is coupled to the first rotor 20 and the drive shaft 24 with relative rotation between the drive shaft and the first rotor causing the storage of potential energy in the torsion spring while varying the angular phase relationship between the first and second rotors to control the output potential of the second embodiment 70 and to further permit the decoupling of the mutual magnetic flux from the first and second rotors from the stators 72 in the event of a stator fault. The configuration of the magnets 42 within the first and second rotors is identical to that described above with respect to the first embodiment 21. The orientation of the magnetic poles of the magnets 42 within the permanent magnet rotors 20 and 22 is in accordance with the orientation illustrated in FIG. 11. A magnetically permeable rotor yoke 82 is provided as part of a low reluctance path for the flux linkages between the stator 72 and the first and second rotors 20 and 22.

Figure 13A:
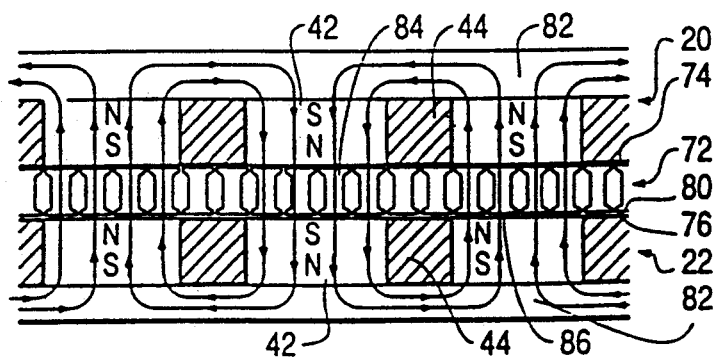
FIGS. 13(a)–13(c) illustrate the flux linkages of a second embodiment of the present invention.
Figure 13B:
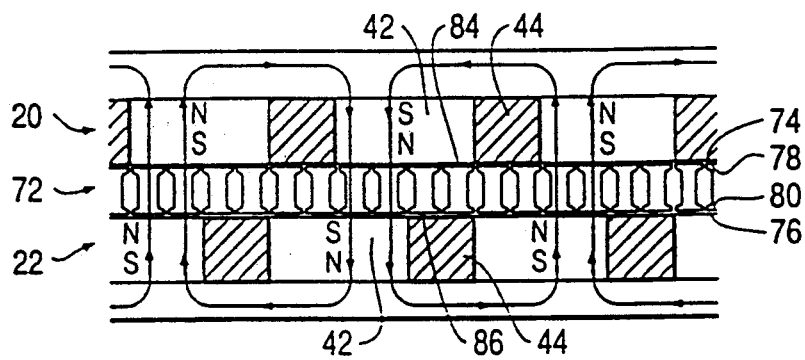
Figure 13C:
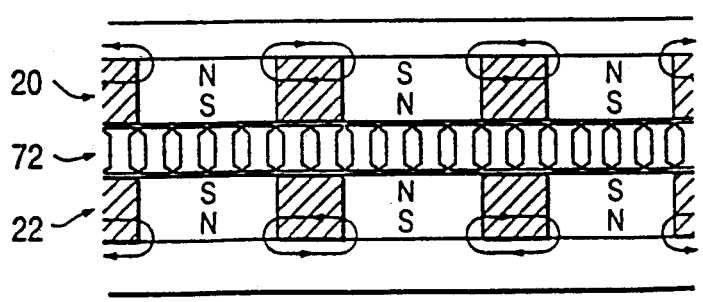

FIGS. 13(a)–(c) illustrate the mutual variable magnitude magnetic axial field which is coupled between the first and second permanent magnet rotors 20 and 22 and the stator 72. FIGS. 13(a) and 13(b) illustrate the mutual variable magnitude magnetic axial field during the generation of the output potential which extends in a loop enclosing spatially opposed non-magnetic material sections with the loop passing through adjacent sections of the stator 84 and 86 which is fixed and opposed pairs of permanent magnets 42 and a magnetic yoke 82 of the first and second rotors 20 and 22. FIG. 13(c) illustrates the flux linkage between the permanent magnet rotors 20 and 22 and the stator 72 when a fault is present in the stator.

Figure 7:
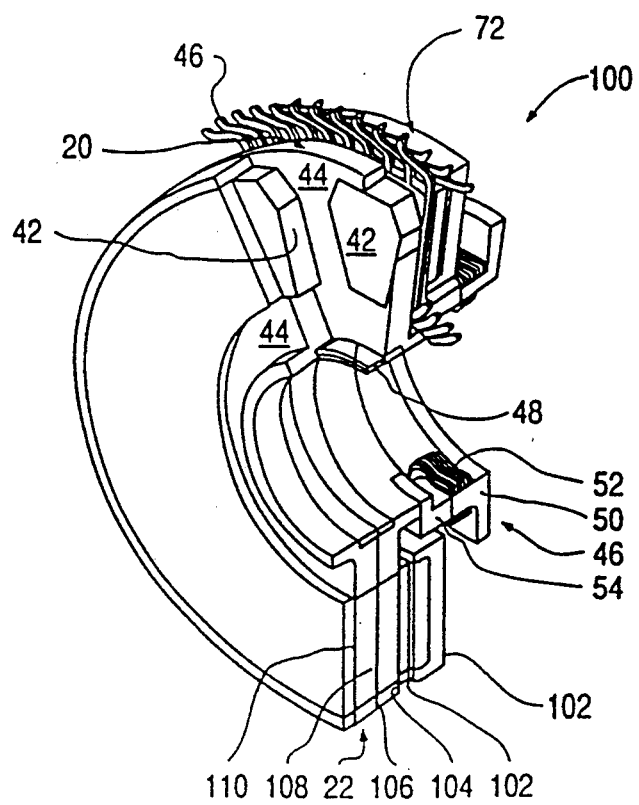
FIG. 7 illustrates a partial isometric view of a third embodiment of the present invention.
Figure 2:
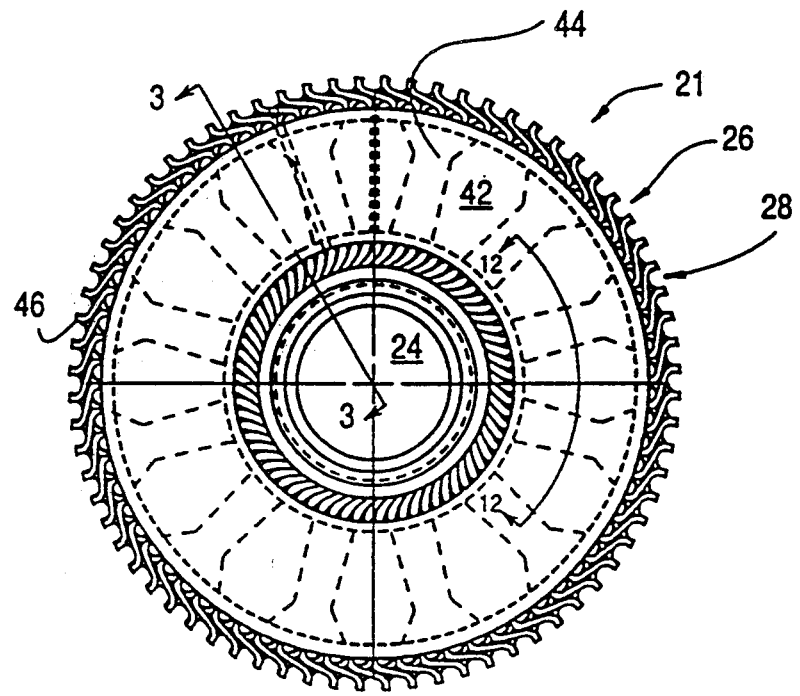
FIG. 2 illustrates an end view of the first embodiment of the present invention.
Figure 8:
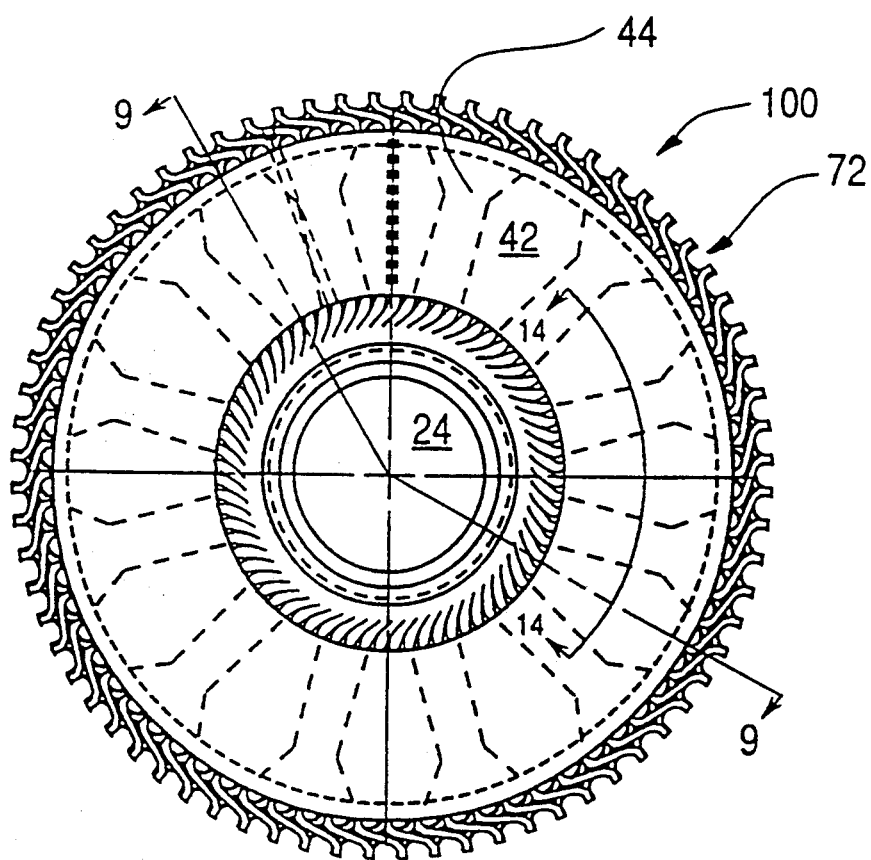
FIG. 8 illustrates an end view of the third embodiment of the present invention.
Figure 9:
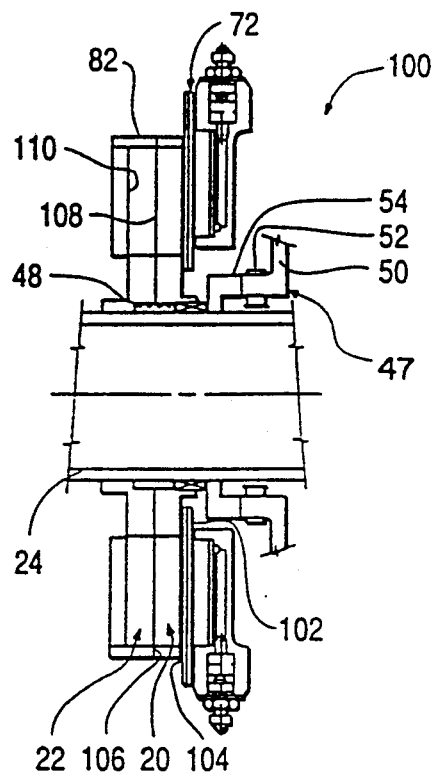
FIG. 9 illustrates a radial sectional view of FIG. 8.

FIGS. 7–9 illustrate a third embodiment 100 of the present invention. Like reference numerals identify like parts in FIGS. 1–9. Stator 72 is fixed to prevent rotation with respect to the drive shaft 24. The stator 72 has spatially opposed radially extending faces 102. The first and second permanent magnet rotors 20 and 22 are attached to the drive shaft 24 with the first and second rotors having radially extending faces 104–110 parallel to the radially extending faces 102 of the stator with the faces of the first and second rotors being spatially opposed to only one radially extending face of the stator with one of the first and second rotors being rotatable with respect to the drive shaft. As illustrated, the first rotor 20 is coupled to the drive shaft by torsion spring 48 with the relative angular position of the first rotor 20 with respect to the second rotor 22 being varied by the combination of the eddy current brake 47 and the torsion spring 48. However, it should be understood that this embodiment, like the other embodiments is not limited to the utilization of the mechanism as illustrated for varying the relative angular position of the first and second rotors 20 and 22 with prior art actuators utilizing electrical, hydraulic or mechanical energy being also applicable for varying the angular position of the rotors for voltage control and decoupling the permanent magnetic flux produced by the rotors 20 and 22 from the stator 72.

Figure 11:
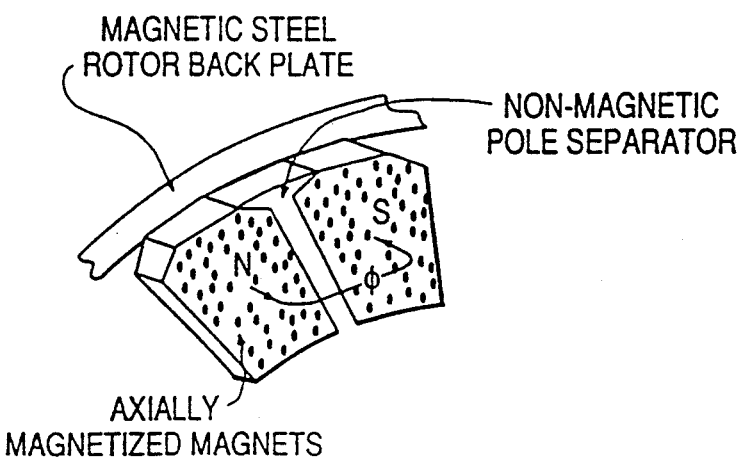
FIG. 11 illustrates a second orientation of the permanent magnets which are mounted within the permanent magnet rotors of several embodiments of the present invention.
Figure 14A:
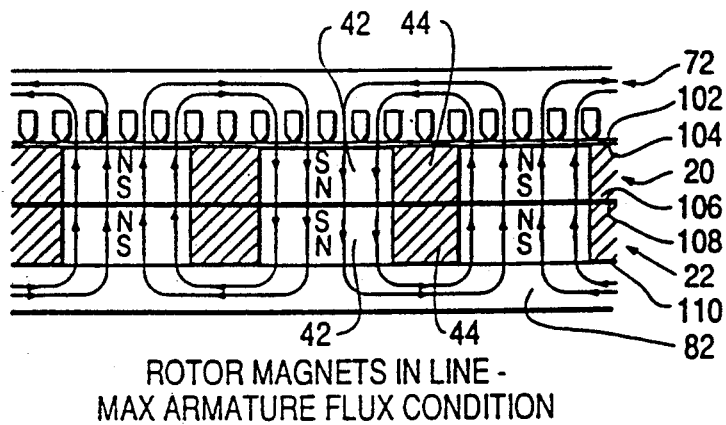
FIGS. 14(a)–14(c) illustrate the flux linkages of a third embodiment of the present invention.
Figure 14B:
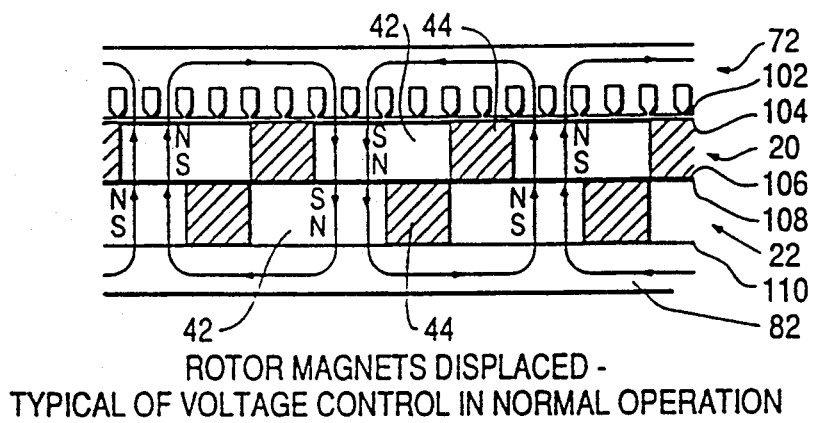
Figure 14C:
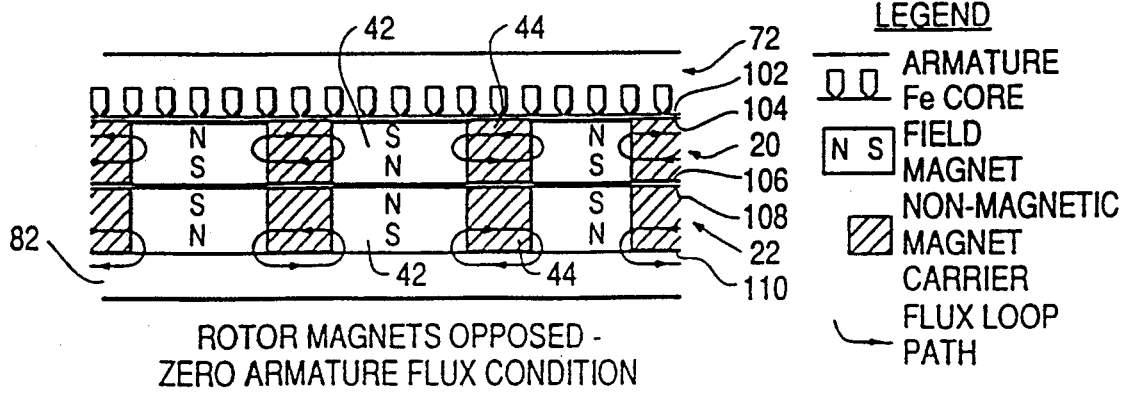

FIGS. 14(a)–(c) illustrate the mutual variable magnetic flux linkages between the first and second permanent magnet rotors 20 and 22 and the stator 72 for the third embodiment. The mutual variable magnitude magnetic axial field during the generation of the output potential is illustrated in FIGS. 14(a) and 14(b). The mutual variable magnitude magnet axial field extends in a flux loop enclosing spatially opposed non-magnetic material sections 44 with the loop passing through the stator 72 which is fixed and spatially opposed pairs 42 of the permanent magnets and a magnetic yoke 82 of the rotor 22. The orientation of the magnets 42 is as illustrated in FIG. 11.

Figure 10:
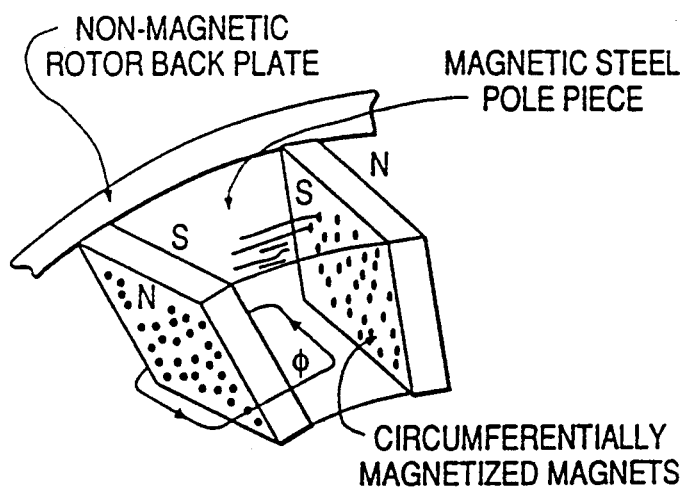
FIG. 10 illustrates a first orientation of permanent magnets which are mounted within a permanent magnet rotors of several embodiments of the present invention.
Figure 15A:
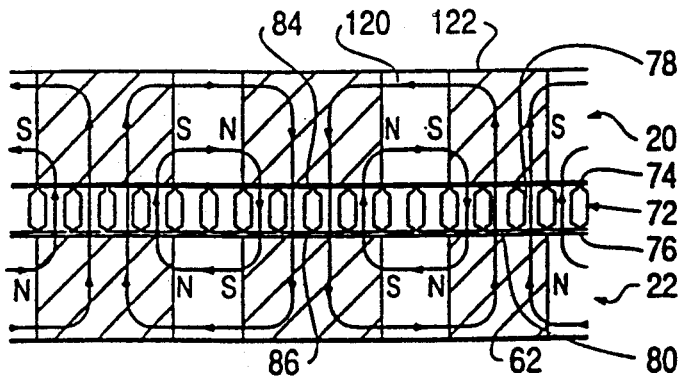
FIGS. 15(a)–15(c) illustrate the flux linkages of a fourth embodiment of the present invention.
Figure 15B:
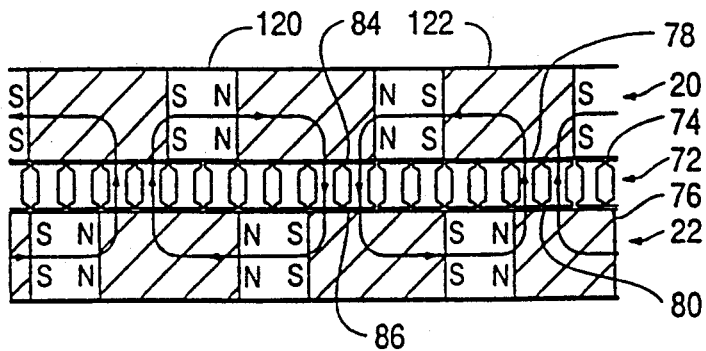
Figure 15C:
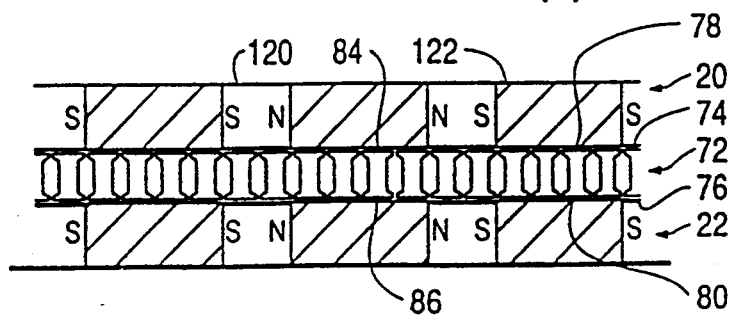

A fourth embodiment of the present invention has a configuration identical to that illustrated in FIGS. 4–6 with the exception that the permanent magnets have an orientation as illustrated in FIG. 10. The axis connecting the north and south pole of the magnets of the fourth embodiment as illustrated in FIG. 10 is perpendicular to the drive shaft 24 instead of parallel to the drive shaft as with the first, second and third embodiments 21, 70 and 100 described above. FIGS. 15(a)–15(c) illustrate the mutual variable magnitude magnetic flux linkage of the fourth embodiment between the stator 72 and the permanent magnet rotors 20 and 22. Like reference numerals identify like parts in FIGS. 1–15. A plurality of radially extending permanent magnets 120 are mounted in each of the first and second rotors at spaced apart circumferential locations disposed around a circumference of the first and second rotors 20 and 22. Radially extending magnetizable material sections, which form magnetic pole pieces 122, are disposed between adjacent permanent magnets. FIGS. 15(a) and 15(b) illustrate the mutual variable magnitude magnet magnetic axial field during the generation of the output potential in a loop extending through adjacent magnetic material sections 122 in the first and second rotors, adjacent sections of the stator which is fixed and spatially opposed pairs of permanent magnets 120. FIG. 15(c) illustrates the orientation of the first and second permanent magnet rotors 20 and 22 with respect to the stator 72 when a fault condition exists in the stator 72 with zero mutual magnetic flux being coupled from the permanent magnet rotors to the stator. The angular orientation of the permanent magnet rotors 20 and 22 with respect to the stator 72 in FIG. 15(c) requires an actuator to rotate the rotors into the alignment as illustrated. The actuator may be in accordance with the eddy current brake 47 and torsion spring 48 described above with respect to the embodiments 21, 70 and 100 or a prior art electrical hydraulic or mechanical actuator used for positioning the rotors of multiple permanent magnet rotor generators.

Figure 16A:
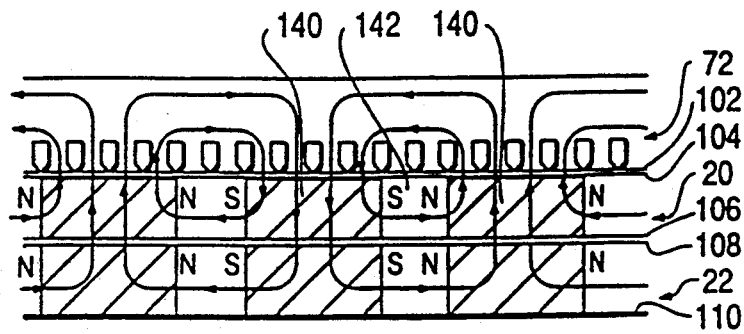
FIGS. 16(a)–16(c) illustrate the flux linkages of a fifth embodiment of the present invention.
Figure 16B:
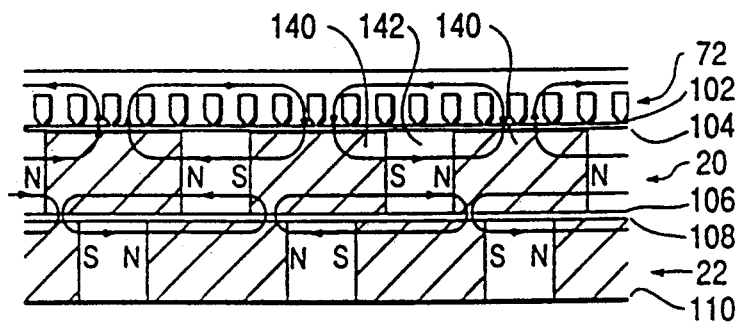
Figure 16C:
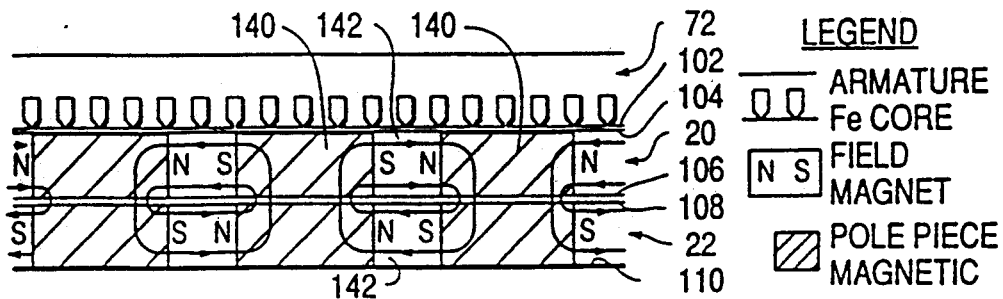

A fifth embodiment of the present invention has a configuration identical to the embodiment 100 illustrated in FIGS. 7–9 with the exception that the orientation of the permanent magnets is as illustrated in FIG. 10. FIGS. 16(a)–(c) illustrate the mutual variable magnitude magnetic axial field coupled between the first and second permanent magnet rotors 20 and 22 and the stator 72. Like reference numerals identify like parts in FIGS. 1–16 FIGS. 16(a) and 16(b) illustrate the mutual variable magnitude magnet axial field during the generation of the output potential extending in first and second loops. Each loop extends through adjacent magnetic material sections 140, which are formed into magnetic pole pieces, at least one of the first and second rotors 20 and 22, stator 72 which is fixed and a permanent magnet 142 within one of the first and second rotors 20 and 22. FIG. 16(c) illustrates the orientation of the first and second permanent magnet rotors 20 and 22 and the stator 72 when zero magnetic flux is coupled to the stator when a stator fault exists.

It should be noted that spatially opposed magnets 142 are in a state of minimum potential energy. As a consequence of the magnetic attraction between opposed magnets in the first and second permanent magnet rotors 20 and 22 when the rotors are in a position coupling zero magnetic flux to the stator 72, the potential energy stored in the magnetic field between the rotors 20 and 22 during the generation of the regulated output potential is converted into kinetic energy to position the rotors 20 and 22 to couple zero flux to the stator 72. As a result, the amount of power required to position the permanent magnet rotors 20 and 22 with the stator 72 in the zero flux condition is minimized which reduces or eliminates the requirement of power being supplied by an external actuator such as in the prior art and in the embodiments described above.

Figure 17A:
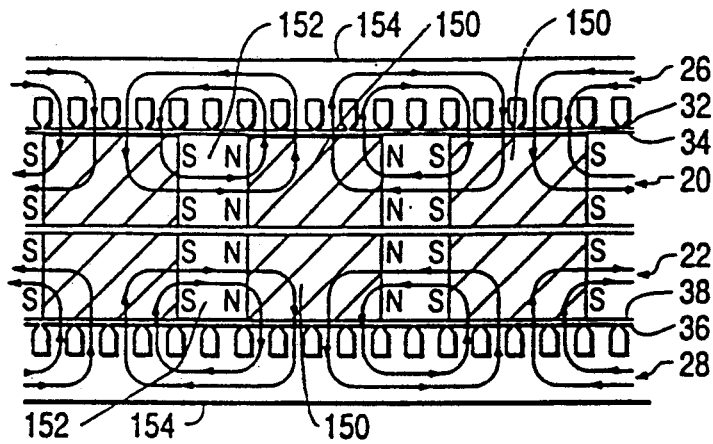
FIGS. 17(a)–17(c) illustrate the flux linkages of a sixth embodiment of the present invention.
Figure 17B:
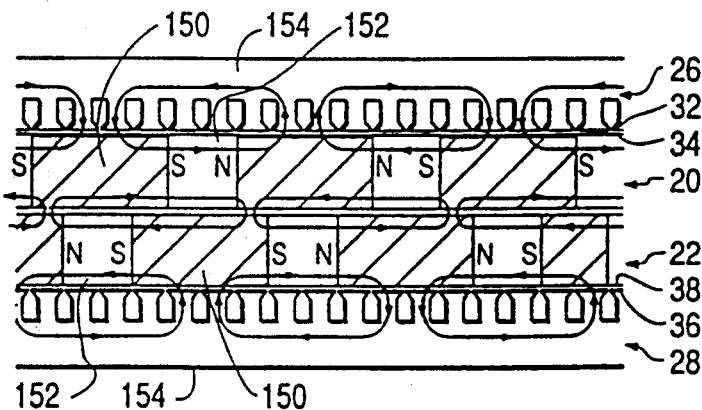
Figure 17C:
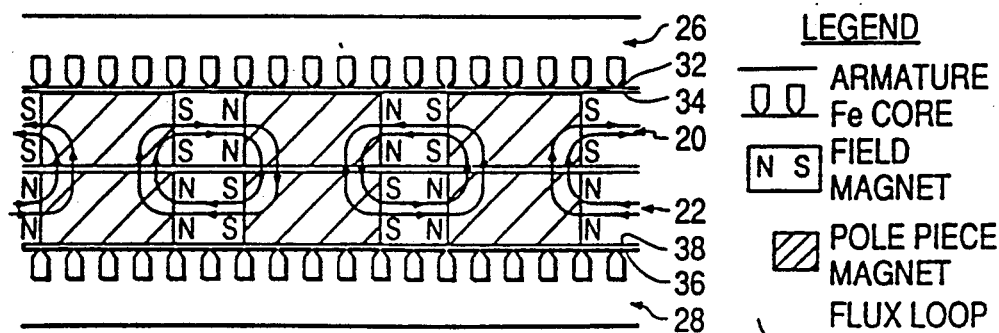

A sixth embodiment of the present invention utilizes a configuration identical to that illustrated above with respect to FIGS. 1-3 except that the permanent magnets are oriented with their magnetic axis as illustrated in FIG. 10. Like reference numerals identify like parts in FIGS. 1-17. FIGS. 17(a)-(c) illustrate the mutual magnetic flux linkage between the first and second rotors 20 and 22 and the first and second stators 26 and 28. The mutual variable magnitude magnetic axial field during generation of the output potential is illustrated in FIGS. 17(a) and 17(b) which extends in a loop through adjacent magnetic material sections 150 which ar formed into pole pieces, a permanent magnet 152 and a section 154 of one of the stators. FIG. 17(c) illustrates the position of the first and second permanent magnet rotors 20 and 22 and the stators 26 and 28 when zero flux is coupled to the stators from the permanent magnet rotors when a fault condition exists in the stator. The configuration of 17(c) is like that of FIG. 16(c) in that minimum potential energy is stored between opposed magnets of the permanent magnet rotors 20 and 22 which provides at least an assist and may eliminate the need for an external actuator to rotate the permanent magnet rotors to a position at which zero magnetic flux is coupled to the stators 26 and 28 from the permanent magnet rotors in response to a stator fault.

The stator windings of the one or more stators may have different electrical connections. For example, without limitation, the windings of plural stators may be in series or in parallel.

While the invention has been described in terms of its preferred embodiments, it should be understood that numerous modifications may be made thereto without departing from the spirit and scope of the invention as defined in the appended claims. For example, it should be understood that the present invention is not limited to any particular wiring configuration of the windings of the one or more stators to perform the voltage regulation of the output potential produced by the generator and is not limited to a particular number of permanent magnet rotors or stators. Furthermore, the present invention may be practiced with different types of actuators for rotating the permanent magnet rotors to angular orientations used for generating a controlled output potential and further for decoupling mutual magnetic flux from the permanent magnet rotors to the one or more stators as illustrated in FIGS. 12(c), 13(c), 14(c), 15(c), 16(c) and 17(c). It is intended that all such modifications fall within the scope of the appended claims.

We claim:

1. A permanent magnet generator having a plurality of permanent magnet generator units which produce a controlled output potential by mutual flux linkage between the permanent magnet generator units to produce the controlled output potential comprising:

a plurality of permanent magnet rotors mounted on a drive shaft with at least one of the rotors being rotatable with respect to the drive shaft to vary an angular position of the at least one of the rotors relative to the shaft to produce a mutual variable magnitude magnetic axial field extending parallel to the drive shaft;

at least one stator disposed at a position axially offset from the plurality of rotors, which is magnetically coupled to the mutual variable magnitude magnetic axial field; and means, responsive to a stator fault, for angularly positioning the rotors relative to each other so that the mutual variable magnitude magnetic axial field coupled to the at least one stator is zero and wherein;

the means for angularly positioning uses the energy stored within the magnetic axial field extending between the plurality of permanent magnet rotors to rotate the rotors to a relative angular position at which the magnetic axial field coupled to the at least one stator is zero in response to a stator fault.

2. A permanent magnet generator having a plurality of permanent magnet generator units which produce a controlled output potential by mutual flux linkage between the permanent magnet generator units to produce the controlled output potential comprising:

a plurality of permanent magnet rotors mounted on a drive shaft with at least one of the rotors being rotatable with respect to the drive shaft to vary an angular position of the at least one of the rotors relative to the shaft to produce a mutual variable magnitude magnetic axial field extending parallel to the drive shaft;

at least one stator disposed at a position axially offset from the plurality of rotors, which is magnetically coupled to the mutual variable magnitude magnetic axial field; and self-regulating means, automatically responsive to a stator fault, for angularly positioning the rotors relative to each other so that the mutual variable magnitude magnetic axial field coupled to the at least one stator is zero.

3. A permanent magnet generator in accordance with claim 1 wherein:

the means uses energy stored within a torsion spring which is coupled to the drive shaft and the at least one rotor to rotate the rotors to a relative angular position at which the magnetic axial field coupled to the at least one stator is zero in response to a stator fault.

4. A permanent magnet generator in accordance with claim 1 further comprising:

first and second permanent magnet rotors mounted on the drive shaft each having spatially opposed first radially extending faces with one of the pair of rotors being rotatable with respect to the drive shaft;

first and second stators which are fixed to prevent rotation with respect to the drive shaft with a first radially extending face of the first stator facing a second radially extending face of the first rotor which is parallel to the first radially extending face of first rotor and a first radially extending face of the second stator facing a second radially extending face of the second rotor which is parallel to the first radially extending face of the second rotor;

a plurality of radially extending permanent magnets mounted in each of the first and second rotors at spaced apart circumferential locations disposed around a circumference of the first and second rotors with radially extending non-magnetizable material sections being disposed between adjacent permanent magnets; and wherein the mutual variable magnitude magnetic axial field during generation of the output potential extends in a loop enclosing spatially opposed non-magnetic material sections of the rotors with the loop passing through spatially opposed sections of the first end second stators and spatially opposed pairs of permanent magnets of the first and second rotors.

5. A permanent magnet generator in accordance with claim 1 further comprising:

a stator which is fixed to prevent rotation with respect to the drive shaft having first and second spatially opposed radially extending faces;

first and second permanent magnet rotors which are attached to the drive shaft with the first rotor having a radially extending face parallel and opposed to the first face of the stator and the second rotor having a radially extending face parallel and spatially opposed to the second face of the stator with one of the first and second rotors being rotatable with respect to the drive shaft;

a plurality of radially extending permanent magnets mounted in each of the first and second rotors at spaced apart circumferential locations disposed around a circumference of the first and second rotors with radially extending non-magnetizable material sections being disposed between adjacent permanent magnets; and wherein the mutual variable magnitude magnetic axial field during the generation of the output potential extends in a loop enclosing spatially opposed non-magnetic material sections of the rotors with the loop passing through adjacent sections of the stator which is fixed and spatially opposed pairs of permanent magnets and a magnetic yoke of the first and second rotors.

6. A permanent magnet generator in accordance with claim 1 further comprising:

a stator which is fixed to prevent rotation with respect to the drive shaft having spatially opposed radially extending faces;

first and second permanent magnet rotors which are attached to the drive shaft with the first and second rotors having radially extending faces parallel to the radially extending faces of the stator with the faces of the first and second rotors being spatially opposed to only one radially extending face of the stator with one of the first and second rotors being rotatable with respect to the drive shaft;

a plurality of radially extending permanent magnets mounted in each of the first and second rotors at spaced apart circumferential locations disposed around a circumference of the first and second rotors with radially extending non-magnetizable material sections being disposed between adjacent permanent magnets; and wherein the mutual variable magnitude magnetic axial field during the generation of the output potential extends in a loop enclosing spatially opposed non-magnetic material sections of the rotors with the loop passing through the stator which is fixed and spatially opposed pairs of the permanent magnets and magnetic yoke of the first and second rotors.

7. A permanent magnet generator in accordance with claim 1 further comprising:

a stator which is fixed to prevent rotation with respect to the drive shaft having first and second opposed radially extending faces;

first and second permanent magnet rotors which are attached to the drive shaft with the first rotor having a radially extending face parallel and opposed to the first face of the stator and the second rotor having a radially extending face parallel and opposed to the second face of the stator with one of the first and second rotors being rotatable with respect to the drive shaft;

a plurality of radially extending permanent magnets mounted in each of the first and second rotors at spaced apart circumferential locations disposed around a circumference of the first and second rotors with radially extending magnetically permeable material sections being disposed between adjacent permanent magnets; and wherein the mutual variable magnitude magnetic axial field during the generation of the output potential extends in a loop through the magnetically permeable material sections in the first and second rotors, adjacent sections of the stator which is fixed and spatially opposed pairs of permanent magnets.

8. A permanent magnet generator in accordance with claim 1 further comprising:

a stator which is fixed to prevent rotation with respect to the drive shaft having opposed radially extending faces;

first and second permanent magnet rotors which are attached to the drive shaft with the first and second rotors having radially extending faces parallel to the radially extending faces of the stator with the faces of first and second rotors being spatially opposed to only one radially extending face of the stator with one of the first and second rotors being rotatable with respect to the drive shaft;

a plurality of radially extending permanent magnets mounted in each of the first and second rotors at spaced apart circumferential locations disposed around a circumference of the first and second rotors with radially extending magnetically permeable material sections being disposed between adjacent permanent magnets; and wherein the mutual variable magnitude magnetic axial field during the generation of the output potential extends in first and second loops, each loop extending through at least one of the first and second rotors, adjacent magnetically permeable material sections of at least one of the first and second rotors, through the stator which is fixed and spatially opposed permanent magnets within one of the first and second rotors.

9. A permanent magnet generator in accordance with claim 1 further comprising:

first and second permanent magnet rotors mounted on the drive shaft each having spatially opposed first radially extending faces with one of the pair of rotors being rotatable with respect to the drive shaft;

first and second stators which are fixed to prevent rotation with respect to the drive shaft with a first radially extending face of the first stator facing a second radially extending face of the first rotor which is parallel to the first radially extending face of first rotor and a first radially extending face of the second stator facing a second radially extending face of the second rotor which is parallel to the first radially extending face of the second rotor;

a plurality of radially extending permanent magnets mounted in each of the first and second rotors at spaced apart circumferential locations disposed around a circumference of the first and second rotors with radially extending magnetically permeable material sections being disposed between adjacent permanent magnets; and wherein the mutual variable magnitude magnetic axial field during generation of the output potential extends in a loop through adjacent magnetically permeable material sections of the rotors, a permanent magnet and a section of one of the stators.

10. A permanent magnet generator in accordance with claim 4 wherein:
an axis extending from a north pole to a south pole of the permanent magnets is parallel to the drive shaft.

11. A permanent magnet generator in accordance with claim 5 wherein:
an axis extending from a north pole to a south pole of the permanent magnets is parallel to the drive shaft.

12. A permanent magnet generator in accordance with claim 6 wherein:
an axis extending from a north pole to a south pole of the permanent magnets is parallel to the drive shaft.

13. A permanent magnet generator in accordance with claim 7 wherein:
an axis extending from a north pole to a south pole of the permanent magnets is perpendicular to the drive shaft.

14. A permanent magnet generator in accordance with claim 8 wherein:
an axis extending from a north pole to a south pole of the permanent magnets is perpendicular to the drive shaft.

15. A permanent magnet generator in accordance with claim 9 wherein:
an axis extending from a north pole to a south pole of the permanent magnets is perpendicular to the drive shaft.

16. A permanent magnet generator having a plurality of permanent magnet generator units which produce a controlled output potential by mutual flux linkage between the permanent magnet generator units to produce the controlled output potential comprising:
first and second permanent magnet rotors mounted on the drive shaft each having spatially opposed first radially extending faces with one of the pair of rotors being rotatable with respect to the drive shaft;
first and second stators which are fixed to prevent rotation with respect to the drive shift with a first radially extending face of the first stator facing a second radially extending face of the first rotor which is parallel to the first radially extending face of first rotor and a first radially extending face of the second stator facing a second radially extending face of the second rotor which is parallel to the first radially extending face of the second rotor;
a plurality of radially extending permanent magnets mounted in each of the first and second rotors at spaced apart circumferential locations disposed around a circumference of the first and second rotors with radially extending non-magnetizable material sections being disposed between adjacent permanent magnets; and wherein
the mutual variable magnitude magnetic axial field during generation of the output potential extends in a loop enclosing spatially opposed non-magnetic material sections of the rotors with the loop passing through spatially opposed sections of the first and second stators and spatially opposed pairs of permanent magnets of the first and second rotors.

17. A permanent magnet generator having a plurality of permanent magnet generator units which produce a controlled output potential by mutual magnetic flux linkage between the permanent magnet generator units to produce the controlled output potential comprising:
a stator which is fixed to prevent rotation with respect to the drive shaft having first and second opposed radially extending faces;
first and second permanent magnet rotors which are attached to the drive shaft with the first rotor having a radially extending face parallel and spatially opposed to the first face of the stator and the second rotor having a radially extending face parallel and spatially opposed to the second face of the stator with one of the first and second rotors being rotatable with respect to the drive shaft;
a plurality of radially extending permanent magnets mounted in each of the first and second rotors at spaced apart circumferential locations disposed around a circumference of the first and second rotors with radially extending non-magnetizable material sections being disposed between adjacent permanent magnets; and wherein
the mutual variable magnitude magnetic axial field during the generation of the output potential extends in a loop enclosing spatially opposed non-magnetic material sections of the rotors with the loop passing through adjacent sections of the stator which is fixed and spatially opposed pairs of permanent magnets and a magnetic yoke of the first and second rotors.

18. A permanent magnet generator having a plurality of permanent magnet generator units which produce a controlled output potential by mutual flux linkage between the permanent magnet generator units to produce the controlled output potential comprising:
a stator which is fixed to prevent rotation with respect to the drive shaft having spatially opposed radially extending faces;
first and second permanent magnet rotors which are attached to the drive shaft with the first and second rotors having radially extending faces parallel to the radially extending faces of the stator with the faces of the first and second rotors being spatially opposed to only one radially extending face of the stator with one of the first and second rotors being rotatable with respect to the drive shaft;
a plurality of radially extending permanent magnets mounted in each of the first ad second rotors at spaced apart circumferential locations disposed around a circumference of the first and second rotors with radially extending non-magnetizable material sections being disposed between adjacent permanent magnets; and wherein
the variable magnitude magnetic axial field during the generation of the output potential extends in a loop enclosing spatially opposed non-magnetic material sections of the rotors with the loop passing through the stator which is fixed and spatially opposed pairs of the permanent magnets and a magnetic yoke of the first and second rotors.

19. A permanent magnet generator having a plurality of permanent magnet generator units which produce a controlled output potential by mutual magnetic flux linkage between the permanent magnet generator units to produce the controlled output potential comprising:
   a stator which is fixed to prevent rotation with respect to the drive shaft having first and second spatially opposed radially extending faces;
   first and second permanent magnet rotors which are attached to the drive shaft with the first rotor having a radially extending face parallel and spatially opposed to the first face of the stator and the second rotor having a radially extending face parallel and spatially opposed to the second face of the stator with one of the first and second rotors being rotatable with respect to the drive shaft;
   a plurality of radially extending permanent magnets mounted in each of the first and second rotors at spaced apart circumferential locations disposed around a circumference of the first and second rotors with radially extending magnetically permeable material sections being disposed between adjacent permanent magnets; and wherein
   the mutual variable magnitude magnetic axial field during the generation of the output potential extends in a loop through magnetically permeable material sections in the first and second rotors, adjacent sections of the stator which is fixed and spatially opposed pairs of permanent magnets.

20. A permanent magnet generator having a plurality of permanent magnet generator units which produce a controlled output potential by mutual magnetic flux linkage between the permanent magnet generator units to produce the controlled output potential comprising:
   a stator which is fixed to prevent rotation with respect to the drive shaft having opposed radially extending faces;
   first and second permanent magnet rotors which are attached to the drive shaft with the first and second rotors having radially extending faces parallel to the radially extending faces of the stator with the faces of first and second rotors being spatially opposed to only one radially extending face of the stator with one of the first and second rotors being rotatable with respect to the drive shaft;
   a plurality of radially extending permanent magnets mounted in each of the first and second rotors at spaced apart circumferential locations disposed around a circumference of the first and second rotors with radially extending magnetically permeable material sections being disposed between adjacent permanent magnets; and wherein
   the mutual variable magnitude magnetic axial field during the generation of the output potential extends in first and second loops, each loop extending through at least one of the first and second rotors, adjacent magnetically permeable material sections of at least one of the first and second rotors, through the stator which is fixed and spatially opposed to permanent magnets within one of the first and second rotors.

21. A permanent magnet generator having a plurality of permanent magnet generator units which produce a controlled output potential by mutual magnetic flux linkage between the permanent magnet generator units to produce the controlled output potential comprising:
   first and second permanent magnet rotors mounted on the drive shaft each having spatially opposed first radially extending faces with one of the pair of rotors being rotatable with respect to the drive shaft;
   first and second stators which are fixed to prevent rotation with respect to the drive shaft with a first radially extending face of the first stator facing a second radially extending face of the first rotor which is parallel to the first radially extending face of first rotor and a first radially extending face of the second stator facing a second radially extending face of the second rotor which is parallel to the first radially extending face of the second rotor;
   a plurality of radially extending permanent magnets mounted in each of the first and second rotors at spaced apart circumferential locations disposed around a circumference of the first and second rotors with radially extending magnetically permeable material sections being disposed between adjacent permanent magnets; and wherein
   the mutual variable magnitude magnetic axial field during generation of the output potential extends in a loop through adjacent magnetically permeable material sections of the rotors, a permanent magnet and a section of one of the stators.

22. A permanent magnet generator in accordance with claim 16 wherein:
   an axis extending from a north pole to a south pole of the permanent magnets is parallel to the drive shaft.

23. A permanent magnet generator in accordance with claim 17 wherein:
   an axis extending from a north pole to a south pole of the permanent magnets is parallel to the drive shaft.

24. A permanent magnet generator in accordance with claim 18 wherein:
   an axis extending from a north pole to a south pole of the permanent magnets is parallel to the drive shaft.

25. A permanent magnet generator in accordance with claim 19 wherein:
   an axis extending from a north pole to a south pole of the permanent magnets is perpendicular to the drive shaft.

26. A permanent magnet generator in accordance with claim 20 wherein:
   an axis extending from a north pole to a south pole of the permanent magnets is perpendicular to the drive shaft.

27. A permanent magnet generator in accordance with claim 21 wherein:
   an axis extending from a north pole to a south pole of the permanent magnets is perpendicular to the drive shaft.

28. A permanent magnet generator in accordance with claim 16 further comprising:
   means, responsive to a stator fault, for angularly positioning the rotors relative to each other so that the variable magnitude magnetic axis field coupled to the first and second stators is zero.

29. A permanent magnet generator in accordance with claim 17 further comprising:
   means, responsive to a stator fault, for angularly positioning the rotors relative to each other so that the 30. A permanent magnet generator in accordance with claim 18 further comprising:

means, responsive to a stator fault, for angularly positioning the rotors relative to each other so that the variable magnitude magnetic axial field coupled to the stator is zero.

31. A permanent magnet generator in accordance with claim 19 further comprising:

means, responsive to a stator fault, for angularly positioning the rotors relative to each other so that the variable magnitude magnetic axial field coupled to the stator is zero.

32. A permanent magnet generator in accordance with claim 20 further comprising:

means, responsive to a stator fault, for angularly positioning the rotors relative to each other so that the variable magnitude magnetic axial field coupled to the stator is zero.

33. A permanent magnet generator in accordance with claim 21 further comprising:

means, responsive to a stator fault, for angularly positioning the rotors relative to each other so that the variable magnitude magnetic axial field coupled to the first and second stators is zero.

* * * * *